US011754241B2

(12) United States Patent
Peng et al.

(10) Patent No.: US 11,754,241 B2
(45) Date of Patent: Sep. 12, 2023

(54) SOLAR OUTDOOR LIGHTS

(71) Applicants: Anguo Peng, Guangdong (CN); Qian Peng, Guangdong (CN)

(72) Inventors: Anguo Peng, Guangdong (CN); Qian Peng, Guangdong (CN)

(73) Assignee: Anguo Peng

( * ) Notice: Subject to any disclaimer, the term of this patent is extended or adjusted under 35 U.S.C. 154(b) by 0 days.

(21) Appl. No.: 17/825,188

(22) Filed: May 26, 2022

(65) Prior Publication Data

US 2023/0059676 A1    Feb. 23, 2023

(30) Foreign Application Priority Data

Jan. 18, 2022  (CN) .......................... 202220128631.1
Apr. 6, 2022  (CN) .......................... 202220779215.8

(51) Int. Cl.
*F21S 9/03*     (2006.01)
*F21V 21/08*    (2006.01)
*F21Y 115/10*   (2016.01)

(52) U.S. Cl.
CPC .......... *F21S 9/037* (2013.01); *F21V 21/0824* (2013.01); *F21Y 2115/10* (2016.08)

(58) Field of Classification Search
CPC ........ F21S 9/037; F21S 8/081; F21V 21/0824
See application file for complete search history.

(56) References Cited

U.S. PATENT DOCUMENTS

| | | | |
|---|---|---|---|
| 8,858,015 B2 * | 10/2014 | Harshaw ................ | F21S 9/037 362/153.1 |
| 11,002,418 B1 * | 5/2021 | Hollinger ............... | F21S 8/081 |
| 11,221,116 B1 * | 1/2022 | Barber .................... | F21V 3/02 |
| 2012/0243213 A1 * | 9/2012 | Chen ...................... | F21S 8/081 362/183 |
| 2013/0049609 A1 * | 2/2013 | Browder ................ | F21S 9/037 315/159 |
| 2020/0263856 A1 * | 8/2020 | Ko .......................... | F21V 15/02 |
| 2021/0262638 A1 * | 8/2021 | Zhao ...................... | F21S 9/037 |
| 2022/0146073 A1 * | 5/2022 | Lu .......................... | F21S 8/022 |
| 2022/0196218 A1 * | 6/2022 | Liu ........................ | F21V 23/003 |

\* cited by examiner

*Primary Examiner* — Christopher E Dunay

(57) ABSTRACT

A solar outdoor lights includes a light source module, a control circuit and a transparent lampshade, wherein the light source module is mounted at top of the lampshade, wherein the light source module includes a housing and a light source assembly arranged below the housing, wherein the light source assembly is arranged on an inner side of the lampshade, and wherein light sources of the light source assembly are wholly or partially arranged above a mass center of the lampshade, wherein the control circuit is electrically connected to the light source assembly for controlling flickering of light sources of the light source assembly, wherein the lampshade is provided with a pattern-forming structure, which interacts with the light source assembly to form dynamic projection patterns on the ground.

20 Claims, 13 Drawing Sheets

SOLAR OUTDOOR LIGHTS

TECHNICAL FIELD

This invention generally relates to the technical field of lighting devices, and more particularly, to a solar outdoor lights.

BACKGROUND

Solar outdoor lights are lighting facilities arranged on lawns or pathways (e.g., in a park). Their appearance is typically aesthetically appealing and their light emission is typically soft. The lamps light the landscape of the city while improving the safety during the night.

Recently, solar outdoor lights have become popular and widespread in the United States, Japan and European countries. In Europe, large lawn-covered areas, promotion of energy conservation and environmental protection make solar outdoor lights a necessity. In the United States, various solar outdoor lights are used in both urban and rural areas. In Japan and South Korean, solar outdoor lights are also extensively used in municipal projects.

However, the single function and poor visual effect of conventional solar outdoor lights result in the failure of meeting the high demands of market. Therefore, it is urgent for those skilled to develop a novel solar outdoor lights.

SUMMARY

The purpose of the present invention is to provide a solar outdoor lights capable of generating light and shadow patterns such that a visual effect of dynamic variation is achieved.

To achieve the above purpose, the present invention adopts the following technical solution: a solar outdoor lights comprises a light source module and a transparent lampshade; the light source module is mounted at the top of the lampshade; the light source module comprises a housing and a light source assembly arranged below the housing; the light source assembly is arranged on the inner side of the lampshade, and the light sources of the light source assembly are wholly or partially arranged above the mass center of the lampshade; the solar outdoor lights further comprises a control circuit, which is electrically connected to the light source assembly for controlling the flickering of light sources of the light source assembly; the lampshade is provided with a pattern-forming structure, which interacts with the flickering light source assembly to form dynamic projection patterns on the ground.

The flickering light rays emitted by the light source assembly passes through the pattern-forming structure of the lampshade to form dynamic projection patterns on the ground, thereby simulating a visual effect of flickering flame.

In another embodiment of the present invention, the pattern-forming structure is a shielding member. The shielding member comprises an opaque structure. The shielding member blocks a part of the light rays emitted by the light source assembly, thereby forming dynamic projection patterns on the ground.

The light rays cannot pass through the shielding member. The projection patterns are formed by portions of the lampshade excluding the shielding member.

In another embodiment of the present invention, the pattern-forming structure is a refracting structure, which enables a part of the light rays emitted by the light sources of the light source assembly to be refracted, thereby forming dynamic projection patterns on the ground. The refracting structure comprises protrusions and/or grooves arranged on the surface of the lampshade.

After passing through the refracting structure, the light rays are not uniformly refracted, which makes the light rays projected on the ground partially brighter and partially darker, thereby forming patterns.

In another embodiment of the present invention, the protrusions and/or the grooves are arranged orderly.

In another embodiment of the present invention, the protrusions and grooves are arranged in rows.

In another embodiment of the present invention, each row of protrusions and each row of grooves are arranged along the generatrix of the lampshade.

In another embodiment of the present invention, the protrusions of an upper layer are arranged on the generatrix where the grooves of a lower layer are located, and the grooves of an upper layer are arranged on the generatrix where the protrusions of a lower layer are located.

In another embodiment of the present invention, the protrusions and grooves are arranged along the circumferential direction of the lampshade.

In another embodiment of the present invention, the thickness of the protrusions becomes greater when getting closer to the bottom of the lampshade.

In another embodiment of the present invention, the solar outdoor lights comprises at least one consecutive protrusion band and/or consecutive groove band 203 formed along the circumferential direction of the lampshade. The protrusion band and/or the groove band enable the light emitted by the light sources to be refracted, thereby forming a consecutive light band and/or a consecutive dark band on the ground to partially or wholly divide the dynamic projection patterns.

In another embodiment of the present invention, the cross-section contour of the consecutive protrusion band comprises a first arc segment, and/or the cross-section contour of the consecutive groove band comprises a second arc segment.

In another embodiment of the present invention, the first arc segment and/or the second arc segment are respectively smoothly transited to the side wall of the lampshade.

In another embodiment of the present invention, the consecutive protrusion bands are closed to form an annular protrusion, and/or the consecutive groove bands are closed to form an annular groove.

In another embodiment of the present invention, the consecutive protrusion bands and/or the consecutive groove bands are arranged horizontally.

In another embodiment of the present invention, the lampshade is configured to be a bell-shaped light-gathering structure with a large upper end and a small lower end. The side wall of the lampshade comprises a first portion, a second portion and a third portion that are sequentially connected. The heights of the first portion, the second portion and the third portion are sequentially reduced, and the diameters of the first portion, the second portion and the third portion are sequentially reduced as well. An included angle is formed between the outer contour of the first portion and the outer contour of the third portion, and the included angle ranges from 150 to 180 degrees.

In another embodiment of the present invention, a consecutive annular groove band is horizontally arranged on the inner side of the second portion and the other consecutive annular groove band is horizontally arranged in the middle of the inner side of the third portion.

In another embodiment of the present invention, the lampshade is a rotating body, and the light source assembly is located on the axis of the lampshade.

In another embodiment of the present invention, the thickness of the lampshade becomes greater when getting closer to the bottom.

In another embodiment of the present invention, the light source of the light source assembly is a point light source. The light source assembly comprises a plurality of LED lamp beads arranged in a vertical direction. The control circuit is electrically connected to the plurality of LED lamp beads, thereby controlling the LED lamp beads to alternatively emit light.

In another embodiment of the present invention, the housing is provided with a first joint portion, and the lampshade is provided with a second joint portion for interacting with the first joint portion, thereby enabling the housing to be detachably mounted at the top of the lampshade.

Compared with the prior art, the present invention has the following advantages:

The solar outdoor lights comprises a light source module, a lampshade and a supporting post. The lampshade is transparent and is provided with a pattern-forming structure. The pattern-forming structure may be a shielding member or a refracting structure. When the pattern-forming structure is a shielding member, a part of the light emitted by the light source assembly is blocked by the shielding member and projected on the ground to form dynamic patterns. When the pattern-forming structure is a refracting structure, after the light rays emitted by the light source assembly passes through the refracting structure, some of the light rays converge in a certain area, and some of the light rays are dispersed, making some areas brighter while some areas darker such that dynamic patterns are formed on the ground.

Other features and advantages of the present application are described in the following, which may partially make the present invention obvious or allow those skilled in the art to understand the present invention. The purpose and other advantages of the present invention may be realized and obtained through the structure specially described in the specification, claims and drawings of the present invention.

DETAILED DESCRIPTION

Figure 1:
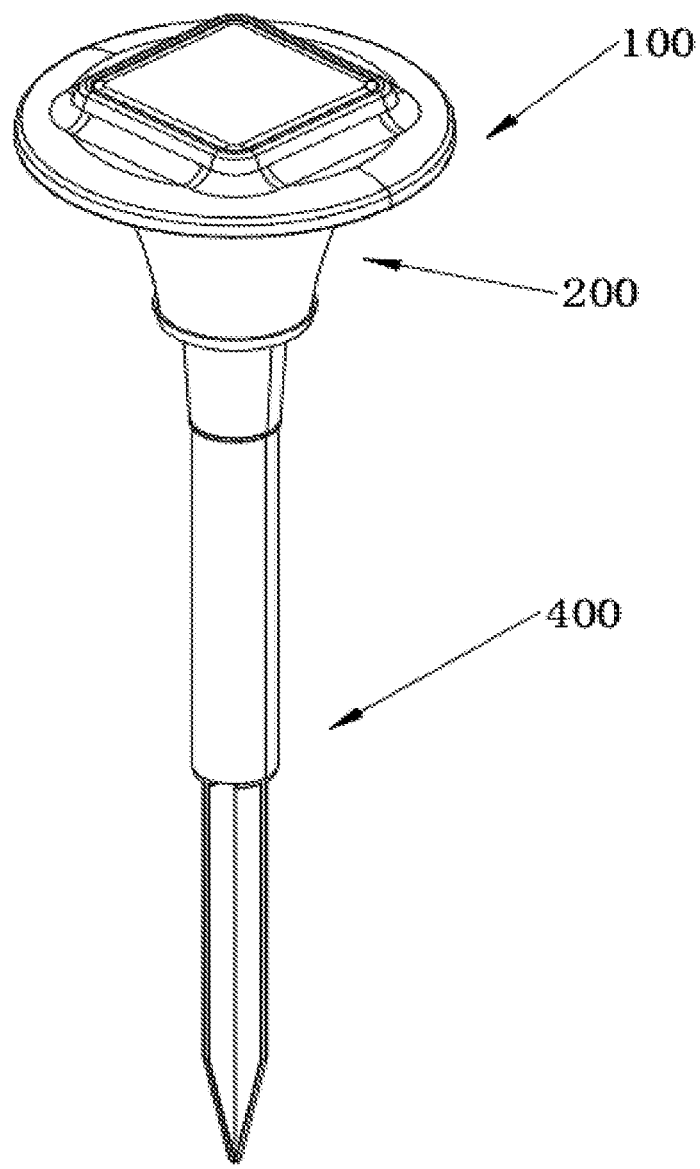
FIG. 1 is a conceptual diagram illustrating a three-dimensional structure of the present invention.

Detailed embodiments of the present invention are described below and exemplary implementations are shown in the drawings. Same or similar reference numerals are used throughout the description to represent same or similar elements or elements having same or similar functions. The embodiments described below are exemplary, which are merely used to elaborate the present invention and therefore should not be understood as limitations to the present invention.

In the description of the present invention, it should be understood that the orientations or positions indicated by terms "central", "longitudinal", "lateral", "length", "width", "thickness", "upper", "lower", "front", "rear", "left", "right", "vertical", "horizontal", "top", "bottom", "inner" and "outer" are based on the orientations or positions shown in the drawings. The above terms are merely for the convenience of describing and simplifying the description of the present invention rather than indicating or implying that the device or element referred to must have a specific orientation, or be constructed and operated in a specific orientation. Therefore, the above terms should not be understood as limitations to the present invention. In addition, the terms "first" and "second" are merely used for descriptive purposes and should not be understood as the indication or implication of relative importance or the implication of the number of indicated technical features. Therefore, a technical feature defined as "first" or "second" may explicitly or implicitly comprises one or more technical features. In the description of the present invention, unless it is clearly stated, "a plurality of" means two or more.

In the description of the present invention, unless it is clearly stated, the terms "installed", "connected" and "jointed" should be understood in a broad sense. For instance, it may be a fixed connection, a detachable connection, a mechanical connection, an electrical connection, a communicational connection, a direct connection, an indirect connection through an intermediate medium, an internal connection between two components or an interaction between two components. For those skilled in the art, the specific meanings of the above terms in the present invention may be understood according to specific circumstances.

In the description of the present invention, unless it is clearly stated, the first feature being "above" or "below" the second feature may indicate that the first feature and the second feature are in direct contact or in indirect contact through other features between them. Moreover, the first feature being "above" the second feature may indicate that the first feature is directly above and obliquely above the second feature, or may simply indicate that the horizontal height of the first feature is higher than that of the second feature. The first feature being "below" the second feature may indicate that the first feature is directly below and obliquely below the second feature, or may simply indicate that the horizontal height of the first feature is lower than that of the second feature.

Various embodiments are provided below for realizing various structures of the present invention. To simplify the description of the present invention, the components and settings of exemplary structures are described below. Definitely, these exemplary structures are not intended to limit the present invention. In addition, reference numbers and/or reference letters may be repeatedly used in various embodiments for the purpose of simplification and clarity, which do not indicate the relationship between various embodiments and/or settings. Moreover, specific processes and materials are provided in the present invention, which enable those skilled in the art to think of the application of other processes and/or the use of other materials.

Figure 2:
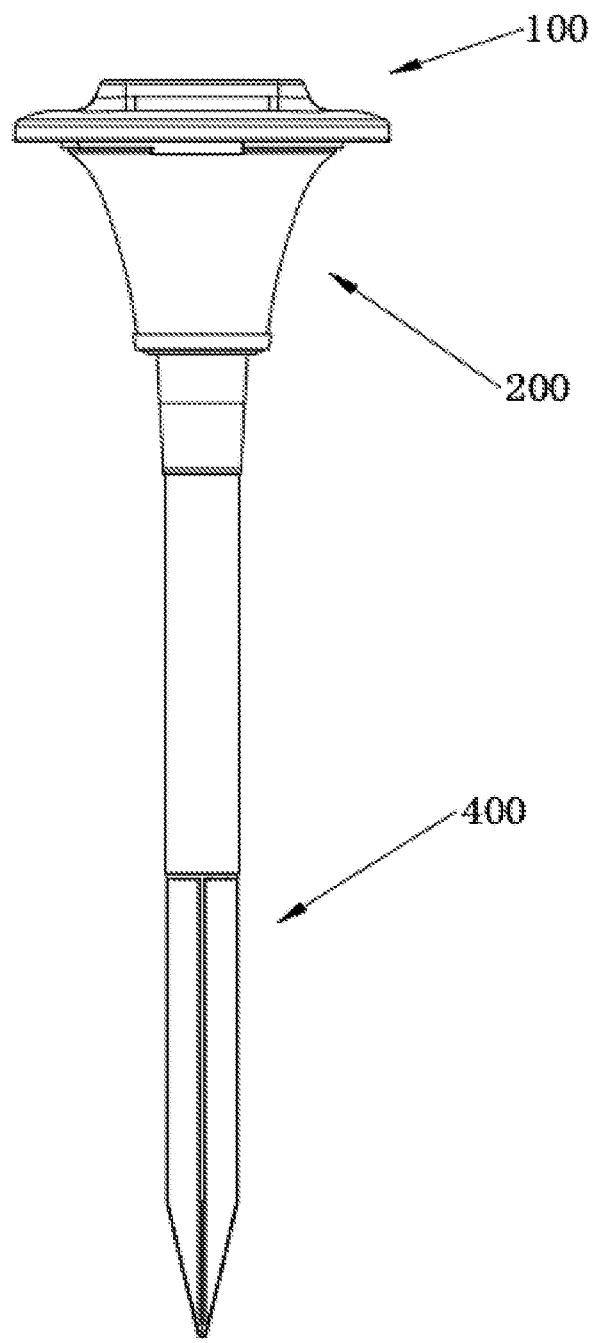
FIG. 2 is a conceptual diagram illustrating a front view of the present invention.
Figure 3:
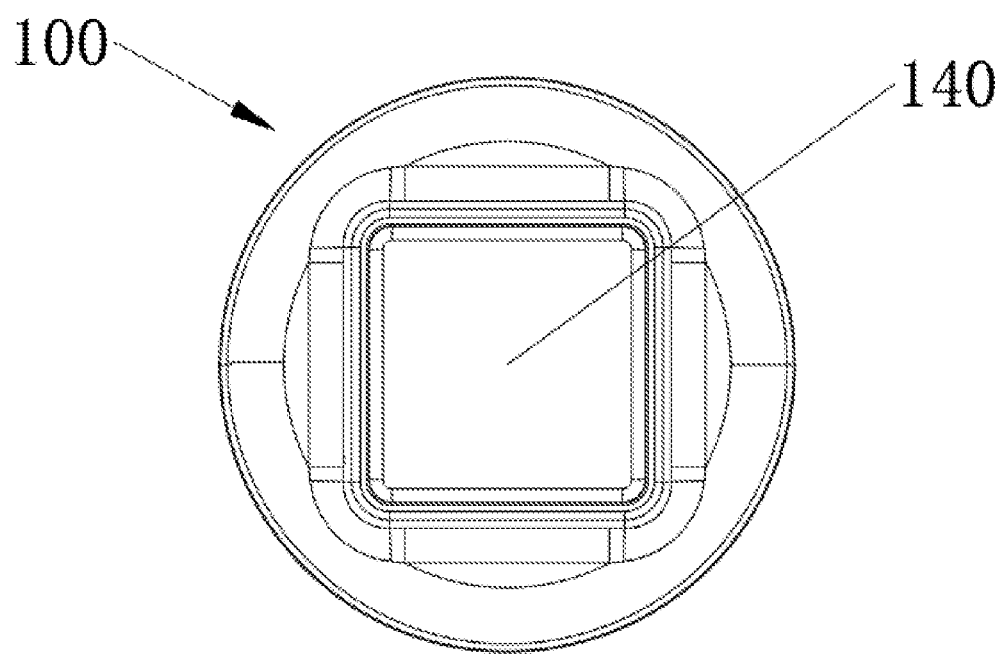
FIG. 3 is a conceptual diagram illustrating a top view of the present invention.
Figure 4:
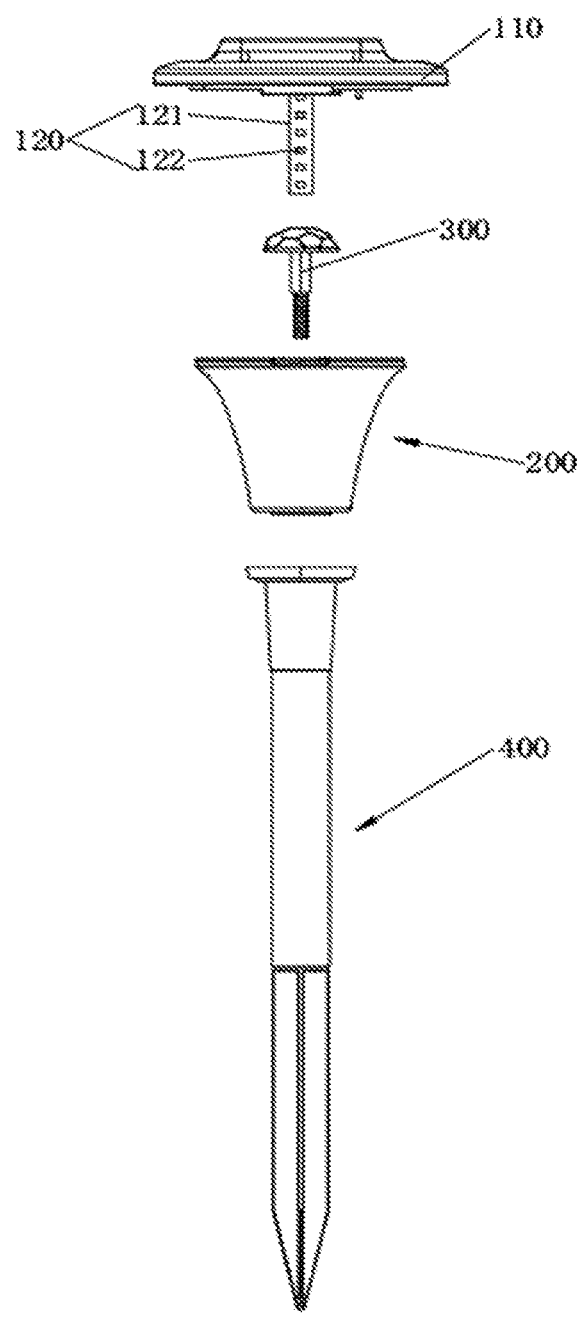
FIG. 4 is a conceptual diagram illustrating an explosive view of the present invention.

FIG. 1 is a conceptual diagram illustrating an exemplary three-dimensional structure of the present invention. FIG. 2 is a conceptual diagram illustrating a front view of the present invention. FIG. 3 is a conceptual diagram illustrating a top view of the present invention. FIG. 4 is a conceptual diagram illustrating an explosive view of the present invention. The solar outdoor lights of the present invention comprises a light source module 100, a lampshade 200 and a supporting post 400 connected with the bottom of the lampshade 200. The lampshade 200 is made of a light-transmitting material. The lower end of the supporting post 400 has a pointed shape, which allows the supporting post 400 to be conveniently inserted into the soil to support the lampshade 200 and the light source module 100. Alternatively, the lower end of the supporting post 400 may be flat, which allows the solar outdoor lights to be placed on the ground and moved freely. The supporting mode may vary according to specific applications.

The light source module 100 is mounted at the top of the lampshade 200. The light source module 100 comprises a housing 110 and a light source assembly 120 arranged below the housing 110. The light source assembly 120 is arranged on the inner side of the lampshade 200 and the light sources are wholly or partially arranged above the mass center of the lampshade 200. The solar outdoor lights further comprises a control circuit, which is electrically connected to the light source assembly 120 for controlling the light sources of the light source assembly 120.

Figure 5:
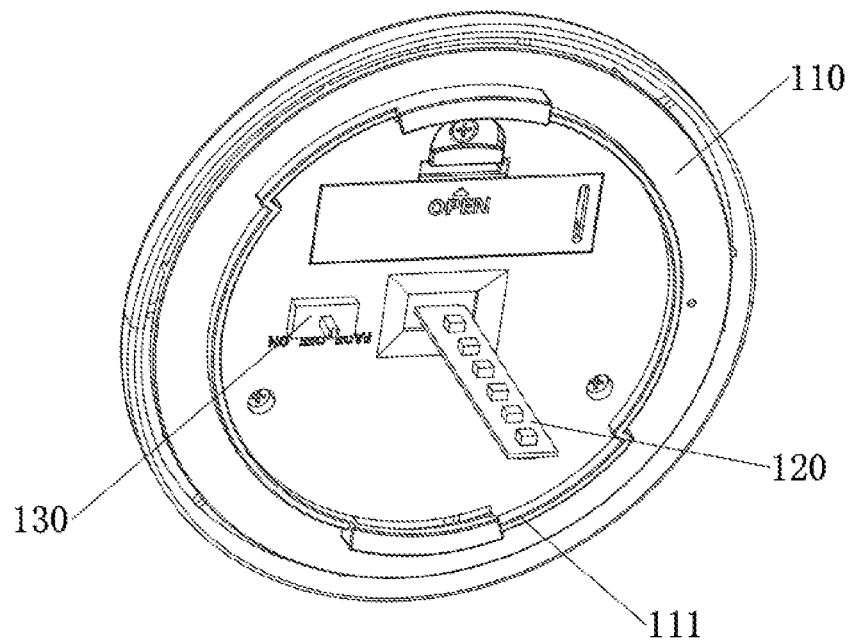
FIG. 5 is a conceptual diagram illustrating a three-dimensional structure of the light source assembly in embodiment 1 of the present invention.

FIG. 5 is a conceptual diagram illustrating a three-dimensional structure in embodiment 1 of the present invention. In embodiment 1, the light source of the light source assembly 120 is a point light source. A point light source is a light source capable of uniformly emitting light from one point to its periphery. Specifically, the light source assembly 120 comprises a vertically-arranged LED lamp panel 121 and a plurality of LED lamp beads 122 arranged on the LED lamp panel in a vertical direction. In this embodiment, the LED lamp beads 122 are respectively arranged on two sides of the LED lamp panel 121. The number of the LED lamp beads 122 on one side of the LED lamp panel 121 is six, and the six LED lamp beads 122 are arranged above the mass center of the lampshade 200. However, in this embodiment, not all of the LED lamp beads 122 are located above the mass center of the lampshade 200 that dynamic projection patterns can be formed on the lawn. This arrangement is merely used to achieve an ideal pattern formation. Actually, the dynamic projection pattern can be formed as long as at least one of the LED lamp beads 122 is located above the mass center of the lampshade 200. It is worth mentioning that, the LED lamp panel 121 is merely a carrier for fixing the LED lamp beads 122 while forming a circuit, and this function may be realized using a wire or achieved through adopting other means.

The LED lamp beads 122 are controlled by the control circuit, and a toggle switch 130 is adopted to control the flickering of the LED light beads 122. Specifically, the control mode of the control circuit comprises an all-bead normally-on mode, an all-bead flickering mode and a flowing-water mode. Each switching position of the toggle switch 130 corresponds to a separate mode. In the all-bead normally-on mode, all of the LED lamp beads 122 are turned on and the brightness of the LED lamp beads 122 reach the highest. This mode is primarily used to provide high-intensity illumination. In the all-bead flickering mode, all of the LED lamp beads 122 are synchronously and gradually dimmed within a certain duration, and the dimming process is realized through the control circuit. The dimming process is typically within 5 to 10 seconds for simulating a flickering flame. In the flowing-water mode, an intermittent (alternating) on and off of the LED lamp beads 122 are sequentially realized. For instance, when there is only one LED lamp bead 122 being normally on within a certain duration, other LED lamp beads 122 remain off. After this duration, a previous LED lamp bead 122 is turned on and other LED lamp beads 122 are turned off. In this way, a flowing-water effect is achieved. It is worth mentioning that, in the flowing-water mode, two or three adjacent LED lamp beads 122 may be turned on instead of one LED lamp bead 122. In this mode, the light ray may be formed by the emission of one or a plurality of point light sources. When there is only one point light source, it moves in a vertical direction. Therefore, along the variation of the forming angle of the projection pattern, a dynamic effect of gradually enlarging and shrinking is presented, which vividly simulates a flickering flame and is visually pleasing. When there is a plurality of point light sources, the distance of each point light source in a vertical direction is equal. Thus, light rays having different angles pass through the projection pattern to achieve a partly bright and partly dark effect. Through adopting the aforesaid design, the contour of the dynamic projection pattern is soft and smooth, significantly improving the quality of the pattern.

Figure 6:
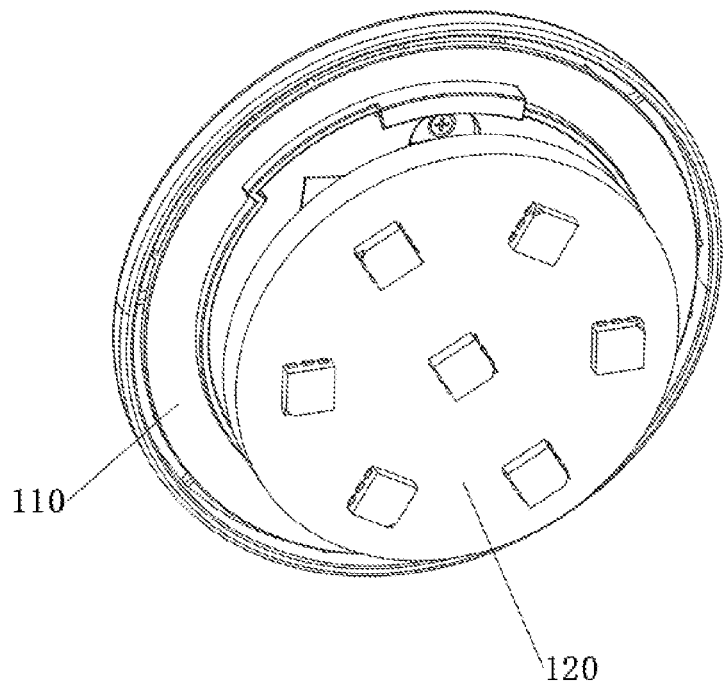
FIG. 6 is a conceptual diagram illustrating a three-dimensional structure of the light source assembly in embodiment 2 of the present invention.

FIG. 6 is a conceptual diagram illustrating a three-dimensional structure of the light source assembly 120 in embodiment 2 of the present invention. In embodiment 2, The light source of the light source assembly 120 adopts a parallel light source. A parallel light source is a light source capable of emitting parallel light rays. As shown in FIG. 6, the LED lamp panel 121 is fixed on a plane parallel to the horizontal plane, and the LED lamp beads 122 are uniformly distributed on the LED lamp panel 121. After the light source assembly 120 is powered on, parallel light rays are emitted vertically downward. Compared with the pattern projected by a point light source, which has uniform brightness on both the bottom and the sides, the brightness of the pattern projected by a parallel light source has higher brightness at the bottom. Furthermore, to prevent the projection pattern from being distorted, the parallel light source should not be used in the flowing-water mode described in embodiment 1. However, the parallel light source is suitable for achieving a flickering flame effect in the all-bead flickering mode.

The power supply of the light source module 100 may adopt one or a combination of a solar power supply, a battery power supply, a grid power supply and a wireless power supply. In this embodiment, the light source module 100 supplies power to the light source assembly 120 by a solar system and a storage battery. The light source module 100 comprises a solar panel 140 fixed on the top surface and a storage battery installed inside the light source module 100. The solar panel 140 is capable of absorbing light energy in the daytime, converting the light energy into electric energy and storing it in the storage battery. The solar panel 140 may also serve as an automatic switch. Namely, when the sunlight intensity becomes lower (e.g., during the night) than a certain threshold, the control circuit is switched on by the solar panel 140, thereby enabling the solar outdoor lights to generate dynamic projection patterns. When the sunlight intensity becomes greater (e.g., after sunrise) than a certain threshold, the control circuit is switched off by the solar panel 140, thereby turning off the solar outdoor lights to avoid further power consumption.

Definitely, the power supply of the light source module 100 may adopt a grid power supply or a wireless power supply. When adopting the grid power supply, the solar outdoor lights is directly connected to the municipal power supply and the light source assembly 120 is directly powered by the AC supply. However, using the grid power supply may sacrifice the portability. The wireless power supply comprises an electromagnetic coupling wireless power supply and a radio wave power supply. The operating principle of the electromagnetic coupling wireless power supply is that, the coil at the transmitting end generates a magnetic field, and the coil at the receiving end receives the magnetic field such that a power output is realized. Further, the radio wave power supply comprises an RF wireless power supply, a laser wireless power supply and an infrared wireless power supply. The RF wireless power supply means arranging a plurality of built-in phase interference antennas at the transmitting end for realizing a millisecond-level spatial positioning of the receiving end and accurately detecting the position of the receiving end. The phase control array composed of a plurality of antennas is capable of directionally transmitting the millimeter wave to the receiving end by means of the beamforming. A beacon antenna and a small receiving antenna array are arranged in the receiving end. The receiving antenna array converts the millimeter wave signal transmitted by the transmitting end into electric energy through a rectifier circuit, thereby realizing the wireless power supply. The laser wireless power supply resembles the infrared wireless power supply. Both of them transmit energy through a beam of high-power electromagnetic wave, and the electromagnetic wave is received by the receiving end and converted into electric energy. However, the electromagnetic wave has low penetrability and is easy to be blocked. To improve the transmission efficiency and achieve a wide application range, the RF wireless power supply is preferred.

The lampshade 200 may be a rotating body, such as a hollow cylinder, a hollow circular truncated cone, a hollow prism, a hollow frustum or a hollow cone, etc. The lampshade 200 may also be a non-rotating body. When the lampshade 200 is a rotating body, the light source assembly 120 is located on the axis of the lampshade 200, and the distance from each light ray to the lampshade 200 at the same height is approximately equal. At this point, the formed dynamic pattern is symmetrical and more aesthetically appealing.

To form dynamic projection patterns, a pattern-forming structure is arranged on the surface of the lampshade 200, and the pattern-forming structure may comprise an opaque shielding member 500 or may be a refracting structure. The operating principles of the two pattern-forming structures are different. The light rays cannot pass through the shielding member 500, and the projection pattern is therefore formed by a portion of the lampshade 200. After the light rays pass through the refracting structure, they are not uniformly refracted, making a part of the light rays projected on the ground darker and another part of the light rays brighter. In this way, a projection pattern is formed.

The refracting structure comprises protrusions arranged on a surface of the lampshade 200 and/or grooves formed in a surface of the lampshade 200. The refracting structure may comprise one or both of them. The protrusions and grooves may be respectively arranged on an inner surface and an outer surface of the lampshade 200 and may also be arranged on the same surface of the lampshade 200. The arrangement of the protrusions and grooves may be ordered or disordered. When the projection pattern is relatively complicated, the arrangement of the protrusions and grooves is disordered, the disordered arrangement makes the projection pattern fuller. And when the projection pattern is relatively simple, the arrangement of the protrusions and grooves is ordered. The ordered arrangement may be a common arrangement, such as a straight line, an array, a spiral line or a wave line, etc. The ordered arrangement makes the projection pattern regular, simplifies the manufacturing process of the lampshade 200, and reduces the manufacturing cost.

Figure 7:
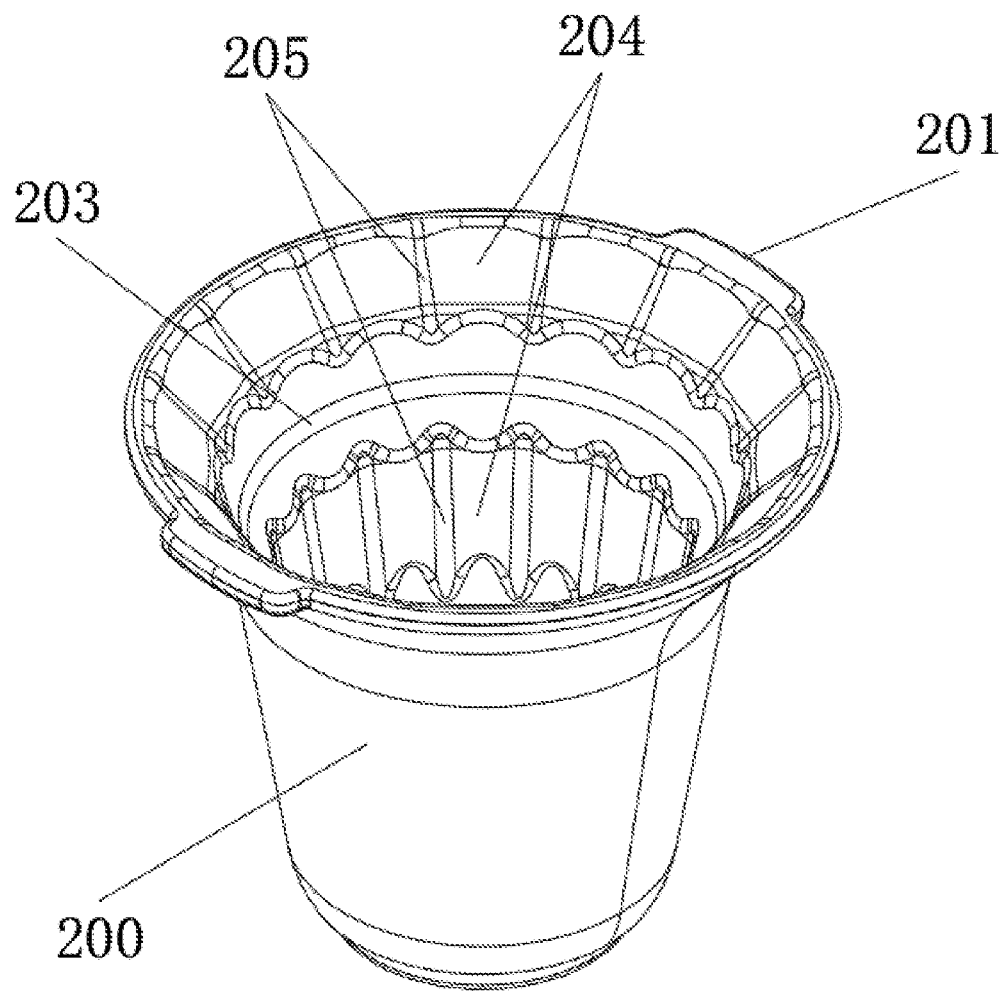
FIG. 7 is a conceptual diagram illustrating a three-dimensional structure of the lampshade in embodiment 1 of the present invention.
Figure 8:
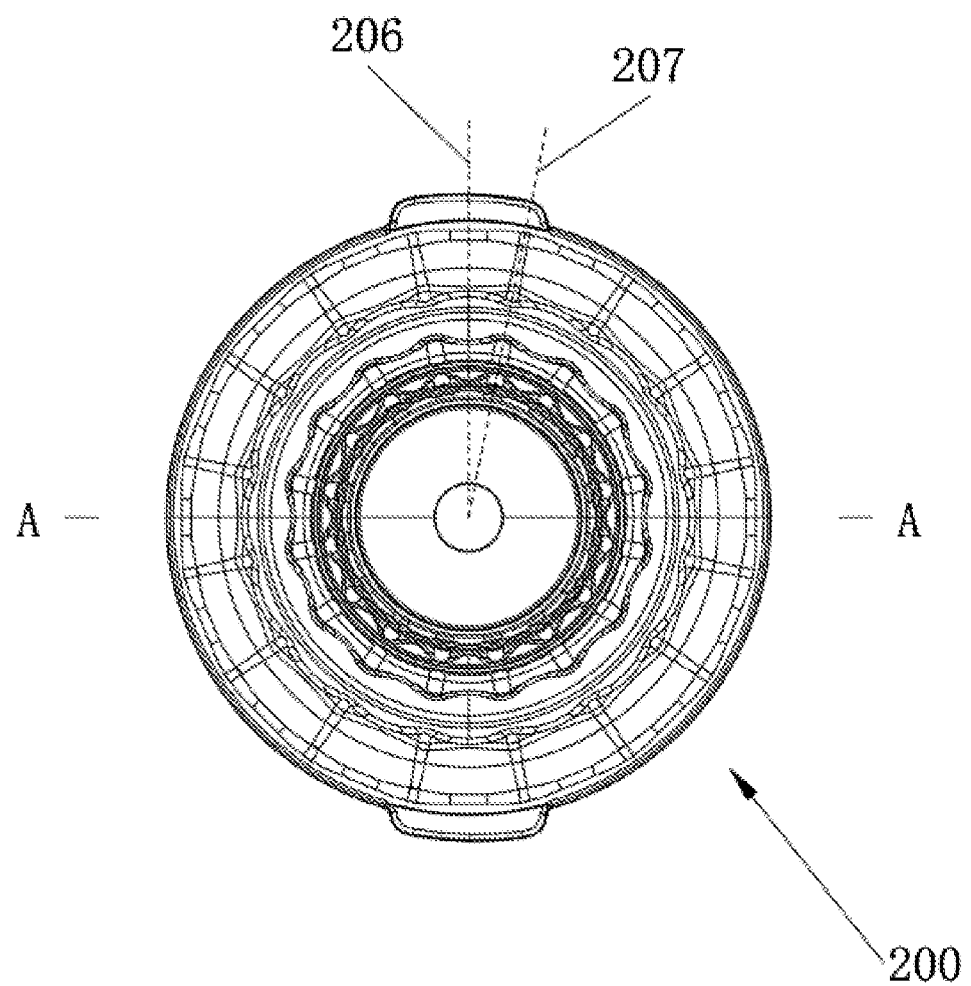
FIG. 8 is a conceptual diagram illustrating a top view of the lampshade in embodiment 1 of the present invention.

FIG. 7 is a three-dimensional diagram of the lampshade 200 in embodiment 1 of the present invention. FIG. 8 shows a top view of the lampshade 200 in embodiment 1 of the present invention. In this embodiment, the protrusions and grooves are orderly arranged. Specifically, the protrusion is a first protrusion 204, and the groove is a first groove 205. The first protrusions 204 and the first grooves 205 are arranged rows in a vertical direction. When the shape of the lampshade 200 is a hollow cylinder or hollow prism, its mater lines are also vertically arranged. The mater lines are arranged in the same manner as the protrusions and grooves. However, for a lampshade 200 having inclined generatrixs, for instance, in this embodiment, when the shape of the lampshade 200 is a hollow circular truncated cone, the first protrusions 204 and the first grooves 205 in each row are arranged along the direction of the generatrixs of the lampshade 200.

As shown in FIG. 8, the vertical dotted line is a first generatrix 206, and the dotted line on the right side of the first generatrix 206 is a second generatrix 207. There are two closed groove bands 203, which are respectively located at one third of the height of the lampshade 200 (namely, the middle of a third portion 210) and two thirds of the height of the lampshade (namely, a second portion 209). Three first protrusions 204 partitioned by a groove band 203 are arranged on the first generatrix 206, and the first groove 205 formed between two adjacent first protrusions 204 is located on the second generatrix 207. The closer the first protrusion 204 is to the top of the lampshade 200, the greater the radius of the lampshade 200 is and the greater the width of the first protrusion 204 is. Contrarily, the closer the first protrusion 204 is to the bottom of the lampshade 200, the smaller the radius of the lampshade 200 is and the smaller the width of the first protrusion 204 is.

Figure 9:
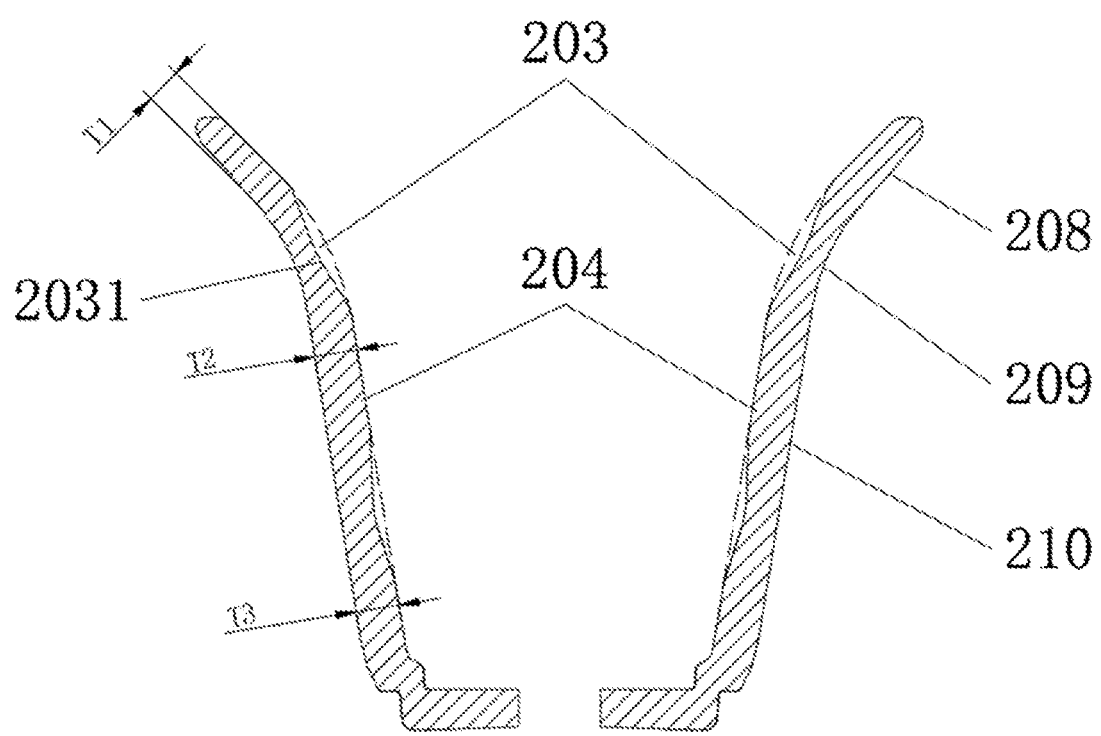
FIG. 9 is a conceptual diagram illustrating a sectional view taken along line A-A in FIG. 8.

When the light emitted by the light source assembly 120 reaches the side wall of the lampshade 200, due to the first protrusions 204 and/or the first grooves 205 formed by the uneven wall thickness, uneven refraction of the light occurs. The wall thickness of the first protrusion 204 is greater than the wall thickness of the first groove 205, and a part of the light therefore forms a light spot at the portion having a greater thickness. The light is dispersed to form a shadow, and the light spot is combined with the shadow to form a projection pattern. As shown in FIGS. 7 and 9, the cross section of the first protrusion 204 is elongated, so that the first protrusion 204 forms a band-shaped light spot on the ground under the irradiation of light. After being dispersed, the light in the first groove 205 has an extremely low brightness. The light spots formed by a plurality of first protrusions 204 are combined to form a plurality of band-shaped light spots radiated outwards by taking the bottom of the solar outdoor lights as a center. After combining with the flickering light emitted by the light sources of the light source assembly 120, dynamic projection patterns are formed on the ground.

When the lampshade 200 is not provided with a protrusion band 202 or a groove band 203, the aforesaid band-shaped light spot is consecutive, and when at least one protrusion band 202 and/or groove band 203 is arranged along the circumferential direction of the lampshade 200, the dynamic projection pattern is partially or wholly divided into at least two portions. Under such circumstances, in the flowing-water mode of the light source assembly 120, the flowing-water effect of the layered light spot becomes conspicuous, achieving an ideal sense of layering.

A consecutive protrusion band 202 or groove band 203 refers to a protrusion band structure or groove band structure formed on the transparent lampshade 200 and extending along the inner wall or outer wall of the transparent lampshade 200. The protrusion band 202 or groove band 203 has a certain length. Through adopting this design, the dynamic projection pattern is effectively split, making the water-flowing effect conspicuous while creating a rich layering sense. The two ends of the protrusion band 202 or groove band 203 may be separated or jointed. When both ends of the protrusion band 202 or groove band 203 are separated, the dynamic projection pattern is partially split, and when the two ends of the protrusion band 202 or groove band 203 are jointed, the protrusion band 202 forms an annular protrusion band, and the groove band 203 forms an annular groove band, so that the dynamic projection pattern is wholly split. It is worth mentioning that the annular protrusion band and the annular groove band may be horizontal or inclined a certain angle to the horizontal plane. Compared with the protrusion band 202 and groove band 203 having separated ends, the annular protrusion band and the annular groove band achieve better layering effect.

In some preferred embodiments, as shown in FIGS. 7-9, the lampshade 200 is configured to be a bell-shaped light-gathering structure with a large upper end and a small lower end. More specifically, the side wall of the lampshade 200 comprises a first portion 208, a second portion 209 and a third portion 210 that are sequentially connected. The heights of the first portion 208, the second portion 209 and the third portion 210 are sequentially reduced, and the diameters of the first portion 208, the second portion 209 and the third portion 210 are sequentially reduced as well. The shape of the cross section of the first portion 208 and the third portion 210 is a straight strip. An included angle is formed between the outer contour of the first portion 208 and the outer contour of the third portion 210, and the included angle ranges from 150 to 180 degrees. The second portion 209 engages the first portion 208 and the third portion 210, and the cross section of the second portion 209 is circular, so that a smooth transition from the first portion to the third portion 210 is realized. When the diameter of the first portion 208 does not vary, the larger the included angle formed by the first portion 208 and the third portion 210 is, the larger the included angle is, and the smoother the transition is. The larger the radius of the projection pattern formed by the light passing through the third portion 210 is, the slower the variation of the projection pattern is.

The light is reflected within the lampshade 200 instead of being refracted. The light sources arranged above the mass center of the lampshade 200 emit light from the upper portion to other portions of the lampshade 200. The light passes through the side wall of the bell-shaped lampshade 200 with a large upper end and a small lower end. Its operating principle resembles that of a concave mirror, which enables the light to be gathered at the bottom of the lampshade 200, thereby making the dynamic projection pattern at the bottom of the solar outdoor lights brighter.

In embodiment 1 of the lampshade 200, two annular groove bands 203 are arranged on the surface of the lampshade 200, wherein one annular groove band 203 is arranged on the inner side of the second portion 209 and the other annular groove band 203 is arranged in the middle of the inner side of the third portion 210. Both of the two annular groove bands 203 are horizontally arranged. The cross-section contour of the annular groove band 203 is an opening, which comprises a second arc segment 2031. The second arc segment 2031 is an inferior arc. The opening of the second arc segment 2031 faces the inner side of the lampshade 200, and the ends of the second arc segment 2031 are respectively tangentially connected with the inner wall of the lampshade 200. The dotted portion in FIG. 9 shows the original thickness of the side wall of the lampshade 200. A smooth transition from the two ends of the second arc segment 2031 to the side wall of the lampshade 200 is achieved, effectively increasing the light input at the edge of the groove band 203. The second arc segment 2031 and the dotted portion are closed to form a symmetrical pattern area. The thickness of the portion provided with a groove band 203 is thinner than that of the other portions, and the transition from it to the side wall of the lampshade 200 is smooth, which enables it to serve as a concave lens. Its operating principle is the same as the aforesaid. The groove band 203 allows the light to be refracted and dispersed to form a dark band.

Figure 10:
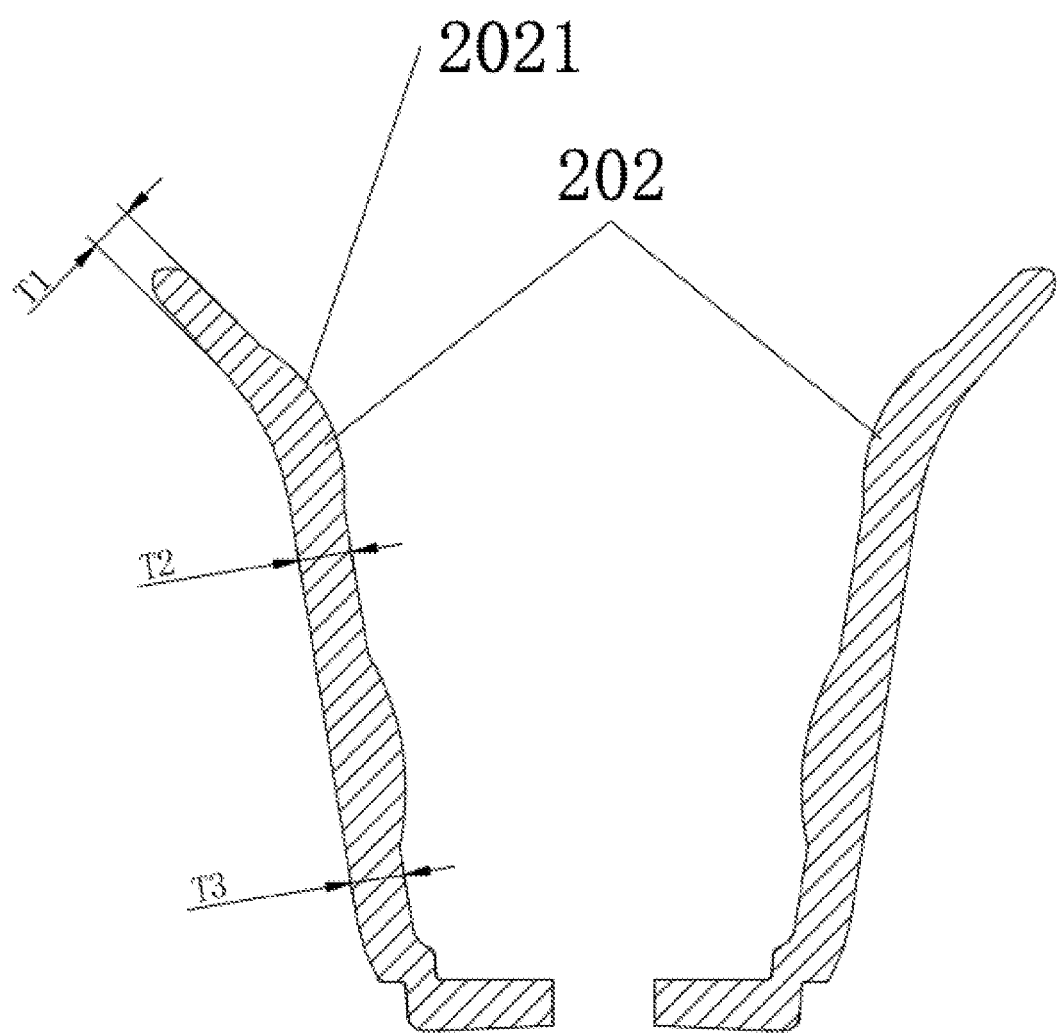
FIG. 10 is a conceptual diagram illustrating a sectional view of the lampshade in embodiment 2 of the present invention.

FIG. 10 is a sectional view of the lampshade 200 in embodiment 2 of the present invention. The surface of the lampshade 200 is provided with a ring-shaped protrusion band 202. The difference between the groove band 203 and the protrusion band is that, the cross-section contour of the protrusion band 202 includes a first arc segment 2021. Except for that the opening of the first arc segment 2021 faces the outer side of the lampshade 200, other features of the first arc segment are the same as that of the second arc segment 2031. The protrusion band 202 serves as a convex lens, which enables the light to be refracted to form a light band and allows the dynamic projection pattern to be split through the light band to achieve an ideal visual effect of layering.

It is worth mentioning that the cross-section contour, the cross-section area, the number and the specific position of the protrusion band 202 or the groove band 203 depend on the pattern formed by the projection. The aforesaid arrangement of the groove band 203 is merely a preferred embodiment, it may vary according to the variation of projection pattern.

Figure 11:
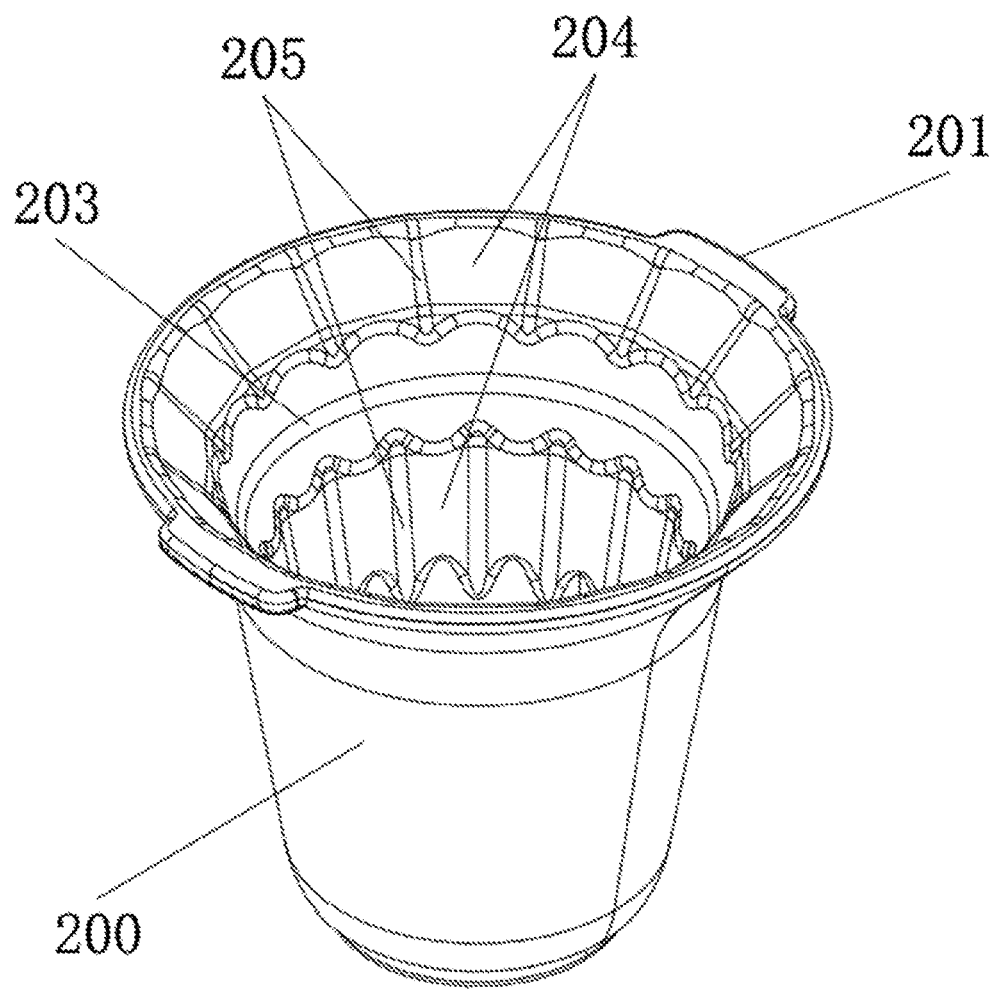
FIG. 11 is a conceptual diagram illustrating a three-dimensional structure of the lampshade in embodiment 3 of the present invention.

FIG. 11 is a three-dimensional diagram of the lampshade 200 in embodiment 3 of the present invention. To generate various projection patterns, in this embodiment, the first protrusions 204 in each layer may not be located on the same generatrix. As shown in FIG. 11, when the first protrusion 204 of an upper layer is located on a mater line where the first groove 205 of a lower layer is located, the first groove 205 of an upper layer is located on a generatrix where the first protrusion 204 of a lower layer is located, the light spots on the same line formed by a plurality of first protrusions that are originally in a same row may deviate. More specifically, the first protrusions 204 of all interval layers are still on the same generatrix. The first protrusion 204 of a middle layer and the first groove 205 adjacent to the first protrusion 204 of a lower layer are located on the same generatrix, so that the band-shaped light spots formed by the light irradiated on the lampshade 200 are mutually staggered. In this way, various dynamic projection patterns are generated.

Figure 12:
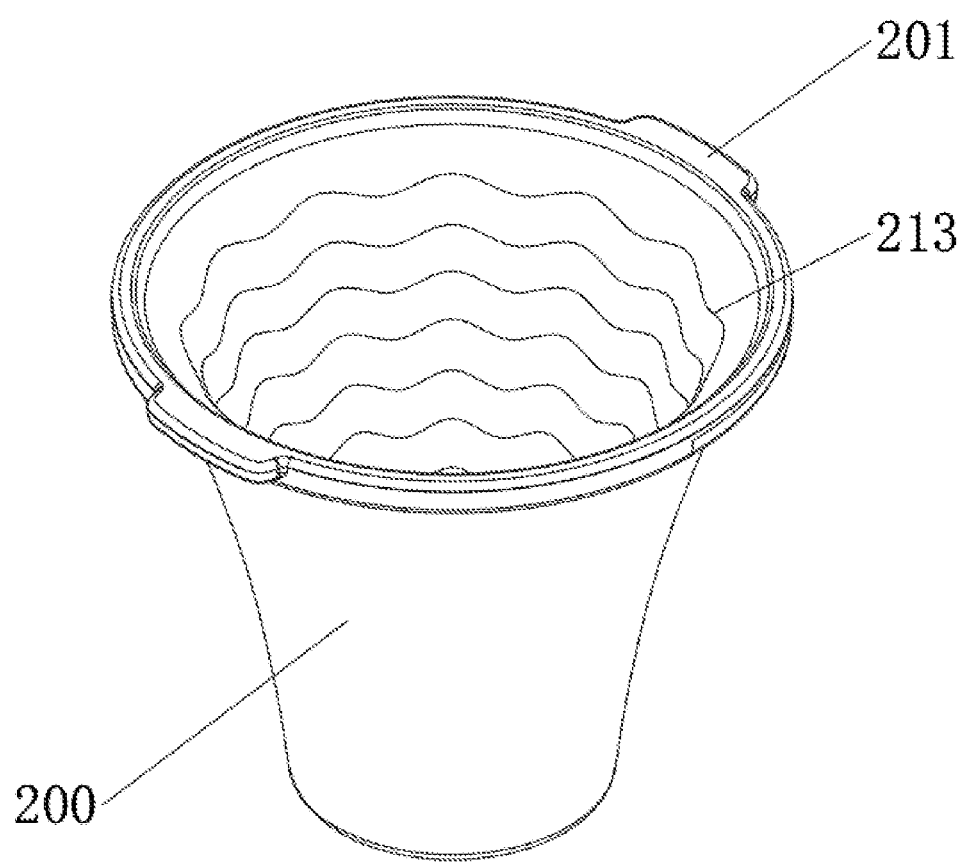
FIG. 12 is a conceptual diagram illustrating a three-dimensional structure of the lampshade in embodiment 4 of the present invention.
Figure 13:
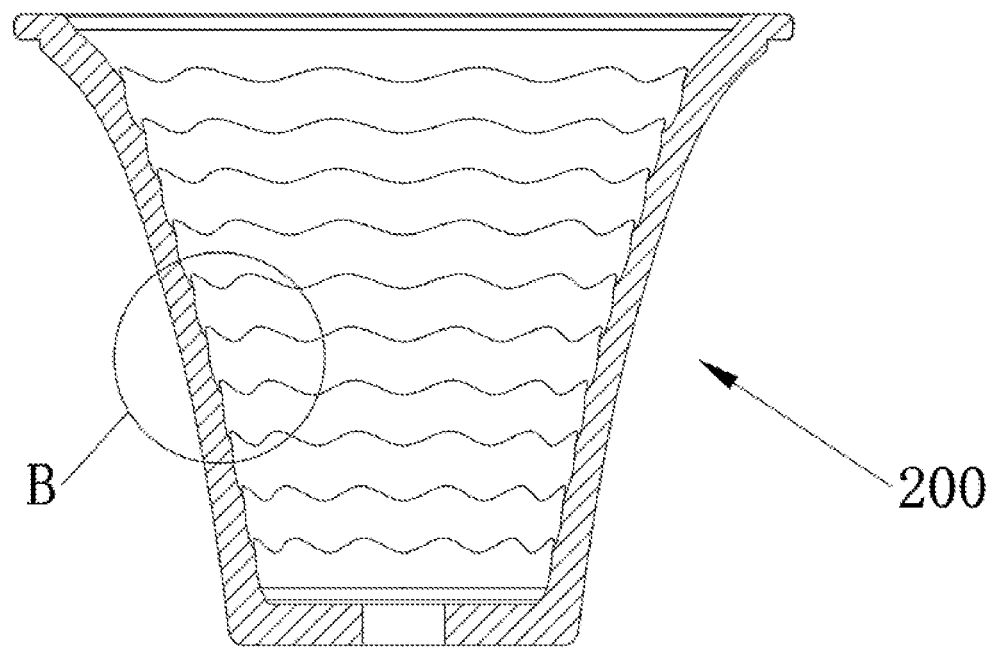
FIG. 13 is a conceptual diagram illustrating a sectional view of the lampshade in embodiment 4 of the present invention.
Figure 14:
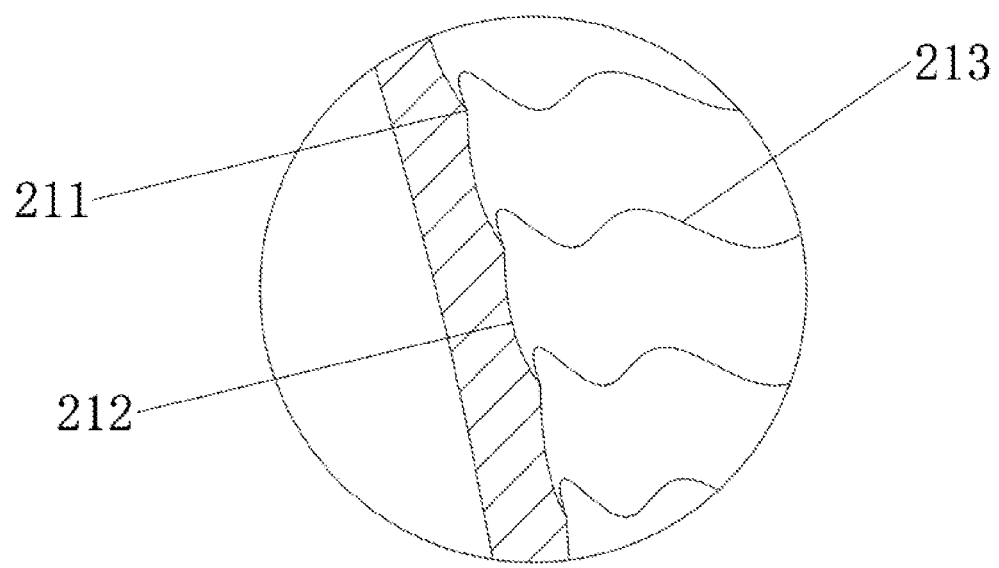
FIG. 14 is a conceptual diagram illustrating a partially enlarged structure of portion B in FIG. 13.

FIG. 12 is a three-dimensional diagram of the lampshade 200 in embodiment 4 of the present invention. FIG. 13 is a sectional view of the lampshade 200 in embodiment 4 of the present invention. In this embodiment, the diameter of the lampshade 200 is gradually reduced and the shape of the lampshade 200 smoothly varies from top to bottom. The inner wall of the lampshade 200 is provided with protrusions and grooves. To better distinguish the protrusion or groove of the lampshade 200 in embodiment 1 from that in embodiment 2, in this embodiment, the protrusion is a second protrusion 211 and the groove is a second groove 212. The second protrusions 211 and/or the second grooves 212 are formed by the uneven wall thickness of the lampshade 200, and both the second protrusions 211 and the second grooves 212 are arranged along the circumferential direction of the lampshade 200. As shown in FIGS. 12 and 13, the inner surface of the lampshade 200 is provided with second protrusions 211 and second grooves 212 layer by layer from top to bottom, and the second protrusion 211 and the second groove 212 are arranged at intervals. The second protrusions 211 and the second grooves 212 are arranged around a circumference along the inner surface of the lampshade 200 and fluctuate in a certain angle. Further, because the cross section of the second protrusion 211 is sharp, as shown in FIG. 14, a stripe 213 protruding towards the interior of the lampshade 200 is presented, thereby forming a wavy pattern resembling a sine wave. When the light emitted by the light source assembly 120 is irradiated on the inner wall of the lampshade 200, due to the uneven wall thickness, the light rays are not uniformly refracted. Namely, some of the light refraction angles are slightly larger, and some of the light refraction angles are slightly smaller. Under such circumstances, some of the light rays converge in a certain area, and some of the light rays are dispersed, making some areas brighter while some areas darker. The combination of brighter light rays and darker light ray form a projection pattern on the ground. After combining with the flickering light of the light sources of the light source assembly 120, dynamic projection patterns are formed on the ground.

Because both the second protrusions 211 and the second grooves 212 are arranged along the circumferential direction of the lampshade 200, and the protrusion band 202 and/or the groove band 203 are also consecutively arranged along the circumferential direction of the lampshade 200, the dynamic projection pattern formed on the ground by the lampshade 200 having the second protrusions 211 and/or the second grooves 212 achieves a layering effect. Namely, the projection pattern formed by the second protrusions 211 resembles a bright band formed by the protrusion band 202, and the projection pattern formed by the second grooves 212 resembles a dark band formed by the groove band 203. Moreover, because the second protrusions 211 and the second grooves 212 are arranged at intervals, the second protrusions 211 and the second grooves 212 function the same way as that of the protrusion band 202 and the groove band 203. Therefore, in this embodiment, the protrusion band 202 and the groove band 203 may not be necessary.

Figure 15:
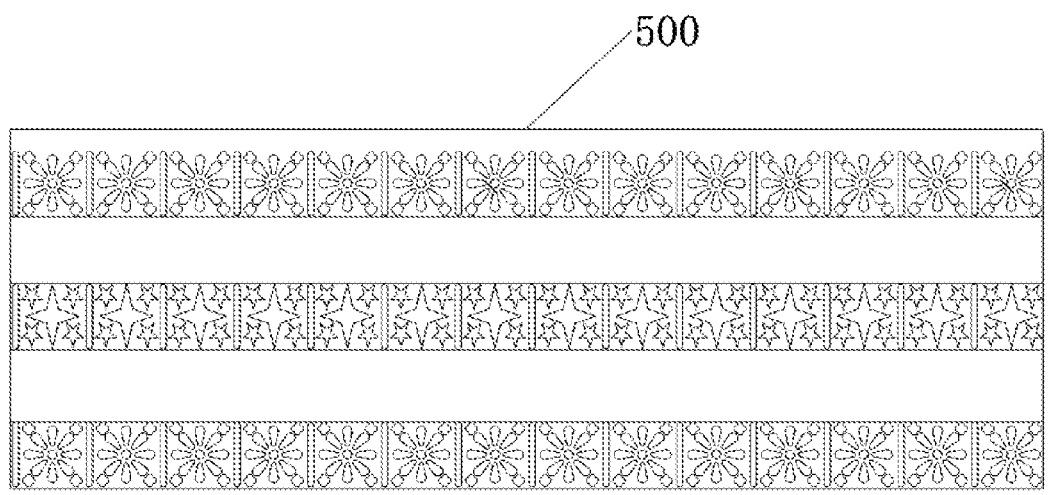
FIG. 15 is a conceptual diagram illustrating an unfolded structure of the shielding member of the present invention. Marking Instructions of the Drawings: 100-Light Source Module, 110-Housing, 111-The First Joint Portion, 120-Light Source Assembly, 121-LED Lamp Panel, 122-LED Lamp Bead, 130-Toggle Switch, 140-Solar Panel, 200-Lampshade, 201-The Second Joint Portion, 202-Protrusion Band, 2021-The First Arc Segment, 203-Groove Band, 2031-The Second Arc Segment, 204-The First Protrusion, 205-The First Groove, 206-The First Generatrix, 207-The Second Generatrix, 208-The First Portion, 209-The Second Portion, 210-The Third Portion, 211-The Second Protrusion, 212-The Second Groove, 231-Stripe, 300-Connecting Member, 400-Supporting Post, 500-Shielding Member.

The pattern-forming structure may include an opaque shielding member 500 made of any opaque materials, such as paper, dark plastic film, metal foil and cloth, etc. In some preferred embodiments, the shielding member 500 is a projection sheet arranged on the inner side and/or outer side of the lampshade 200. As shown in FIG. 15, the projection sheet may be a flat sheet or a sheet having a shape matched with the lampshade 200. The projection sheet may be placed within the lampshade 200 and attached with the side wall of the lampshade 200. The surface of the projection sheet is provided with an opaque film layer printed with a shielding pattern or provided with a light-transmitting groove complementary to the shielding pattern. The projection sheet may be easily replaced, allowing the patterns to be better formed on the projection sheet.

As shown in FIG. 15, the projection sheet is provided with three rows of patterns, and each row of pattern comprises a plurality of basic pattern elements. A basic pattern element refers to a common pattern element such as a circle, a semicircle, or a polygon, etc. A row is reserved for the light-transmitting area of the layering structure between each two rows of patterns. Except for the pattern and the reserved area, other areas are opaque. After a part of the light is blocked, the light rays passing through the pattern on the projection sheet form dynamic projection patterns.

Alternatively, there are two other technical solutions capable of making the dynamic projection pattern at the bottom of the solar outdoor lights brighter. One is to make the thickness of the first protrusion 204 greater when getting closer to the bottom of the lampshade 200, and the other is to make the thickness of the lampshade 200 greater when getting closer to the bottom of the lampshade 200. Referring to the dimension lines marked in FIGS. 9 and 10, the relationship among the thickness values corresponding to the top, middle and bottom of the side wall of the lampshade 200 is T1<T2<T3. Substantively, both of the two solutions are to increase the thickness from the first protrusion 204 at the bottom of the lampshade 200 to the outer wall of the lampshade 200. Theoretically, it is feasible to merely increase the thickness of the side wall at the bottom of the lampshade 200, or merely increase the thickness of the first protrusion 204 at the bottom of the lampshade 200, or simultaneously increase both of them.

To achieve a convenient replacement of the lampshade 200, the bottom of the lampshade 200 is provided with a through hole, and the lampshade 200 is connected to the supporting post 400 through a connecting member 300. The connecting member 300 may be a screw, a pin, or other fasteners. In this embodiment, the connecting member 300 is a screw. To reduce the loss of light as much as possible, a reflecting mirror is arranged on the exposed top after the lampshade 200 is fastened with the supporting post 400 by using screws. The reflecting mirror reflects the light at the bottom of the lampshade 200 which cannot be projected on the ground, thereby significantly improving the lighting efficiency.

To allow the lampshade 200 to be conveniently removed, a second joint portion 201 is arranged at the top of the lampshade 200, and the second joint portion 201 comprises two blocking sheets protruding horizontally outward from the edge. The housing 110 of the light source module 100 is provided with a first joint portion 111 corresponding to the second joint portion 201. As shown in FIG. 5, specifically, the first joint portion 111 is a clamping groove formed at each side of the outer peripheral surface of the housing 110, and the second joint portion 201 may slide into the clamping groove of the first joint portion 111 from one end and be clamped at the other end, which effectively prevents the first joint portion 111 and the second joint portion 201 from moving relative to each other. The first joint portion 111 and the second joint portion 201 may also be any structures capable of being quickly disassembled, such as a snap-fit connection, a magnetic connection or an adhesive connection, etc. After the light source module 100 and the lampshade 200 are assembled in a threaded manner, a closed waterproof structure is formed, allowing the light source module 100 to be used in the outdoors. After the light source module 100 and the lampshade 200 are disassembled, the lampshade 200 can be conveniently replaced.

In the specification of the present invention, the terms "one embodiment", "some embodiments", "exemplary embodiments", "examples", "specific examples" and "some examples" mean that the specific features, structures, materials or characteristics described therein are included in at least one embodiment or example of the present invention. In the specification, the aforesaid terms do not necessarily mean the same embodiment or example. Further, the specific features, structures, materials or characteristics described in the specification may be combined in a proper way in any one or more embodiments or examples.

The above are merely some embodiments of the present invention. For those skilled in the art, various modifications and improvements may be made without departing from the spirit of the present invention, and all of which shall therefore fall into the scope of the present invention.

The invention claimed is:

1. A lawn lamp, comprising:
   a light source module (100), and
   a transparent lampshade (200), wherein the light source module (100) is mounted at the top of the lampshade (200), wherein the light source module (100) further comprising a housing (110) and a light source assembly (120) arranged below the housing (110),
   wherein the light source assembly (120) is arranged on the inner side of the lampshade (200), and the light sources are wholly or partially arranged in the mass center of the lampshade (200),
   wherein a control circuit, is electrically connected to the light source assembly (120) for controlling the flickering of light sources of the light source assembly (120),
   wherein the lampshade (200) is provided with a pattern-forming structure, which interacts with the flickering light source assembly (120) to form dynamic projection patterns on the ground,
   wherein the pattern-forming structure comprises at least one protrusion band (202) and at least one groove band (203) are formed along the circumferential direction of the lampshade consecutively, wherein the at least one protrusion band (202) and at least one the groove band (203) enable the light emitted by the light sources to be refracted, thereby forming at least one light band and at least one dark band on the ground to partially or wholly divide the dynamic projection patterns.

2. The lawn lamp of claim 1, wherein the pattern-forming structure is a shielding member (500), wherein the shielding member (500) comprises an opaque structure,
   wherein the shielding member blocks a part of the light rays emitted by the light source assembly (120), thereby forming dynamic projection patterns on the ground.

3. The lawn lamp of claim 1, wherein the pattern-forming structure is a refracting structure, which enables a part of the light rays emitted by the light source assembly (120) to be refracted, thereby forming dynamic projection patterns on the ground, wherein the refracting structure comprises the at least one protrusion band (202) and the at least one groove band (203) arranged on the surface of the lampshade (200).

4. The lawn lamp of claim 3, wherein the protrusions and the grooves are arranged consecutively.

5. The lawn lamp of claim 4, wherein the thickness of the at least one protrusion band (202) becomes greater when getting closer to the bottom of the lampshade (200).

6. The lawn lamp of claim 3, wherein the at least one protrusion band (202) and the at least one groove band (203) are arranged in rows.

7. The lawn lamp of claim 6, wherein each row of the at least one protrusion band and each row of the at least one groove band are arranged along a master line of the lampshade (200).

8. The lawn lamp of claim 7, wherein the at least one protrusion band of an upper layer are arranged on the master line where the at least one groove band of a lower layer are located, and the at least one groove band of an upper layer are arranged on the master line where the at least one protrusion band of a lower layer are located.

9. The lawn lamp of claim 3, wherein the at least one protrusion band (202) and the at least one groove band (203) are arranged along the circumferential direction of the lampshade (200).

10. The solar outdoor lights of claim 1,
    wherein bottom of the lampshade is connected to a supporting post (400) through a connecting member, wherein a plurality of reflecting mirrors is arranged on top of the connecting member,
    wherein the light source assembly protrudes vertically from the housing, wherein a plurality of LED lamps beads is arranged vertically on two sides of the light source assembly, wherein the light source assembly is aligned with the center of the connecting member.

11. The lawn lamp of claim 1, wherein the cross-section contour of consecutive protrusion bands (202) of the at least one protrusion band comprises a first arc segment (2021), and the cross-section contour of consecutive groove bands (203) of the at least one groove band comprises a second arc segment (2031).

12. The lawn lamp of claim 11, wherein the first arc segment (2021) and/or the second arc segment (2031) are respectively smoothly transited to the side wall of the lampshade (200).

13. The lawn lamp of claim 11, wherein the consecutive protrusion bands (202) are closed to form an annular protrusion, and/or the consecutive groove bands (203) are closed to form an annular groove.

14. The lawn lamp of claim 11, wherein the consecutive protrusion bands (202) and/or the consecutive groove bands (203) are arranged horizontally.

15. The lawn lamp of claim 1, wherein the lampshade (200) is configured to be a bell-shaped light-gathering structure with a large upper end and a small lower end, wherein the side wall of the lampshade (200) comprises a first portion (208), a second portion (209) and a third portion (210) that are sequentially connected, wherein the heights of the first portion (208), the second portion (209) and the third portion (210) are sequentially reduced, and the diameters of the first portion (208), the second portion (209) and the third portion (210) are sequentially reduced as well, wherein an included angle is formed between the outer contour of the first portion (208) and the outer contour of the third portion (210), and the included angle ranges from 150 to 180 degrees.

16. The lawn lamp of claim 15, wherein a consecutive annular groove band (203) of the at least one groove band is horizontally arranged on the inner side of the second portion (209) and another consecutive annular groove band (203) of the at least one groove band is horizontally arranged in the middle of the inner side of the third portion (210).

17. The lawn lamp of claim 1, wherein the lampshade (200) is a rotating body, and the light source assembly (120) is located on the axis of the lampshade (200).

18. The lawn lamp of claim 1, wherein the thickness of the lampshade (200) becomes greater when getting closer to the bottom.

19. The lawn lamp of claim 1, wherein the light source of the light source assembly (120) is a point light source, wherein the light source assembly (120) comprises a plurality of LED lamp beads (122) arranged in a vertical direction, wherein the control circuit is electrically connected to the plurality of LED lamp beads (122), thereby controlling the LED lamp beads (122) to alternatively emit light.

20. The lawn lamp of claim 1, wherein the housing (110) is provided with a first joint portion (111), and the lampshade (200) is provided with a second joint portion (201) for interacting with the first joint portion (111), thereby enabling the housing to be detachably mounted at the top of the lampshade (200).

\* \* \* \* \*